L. R. COMSTOCK.
Stove Pipe Damper.
No. 59,362.
Patented Nov. 6, 1866.
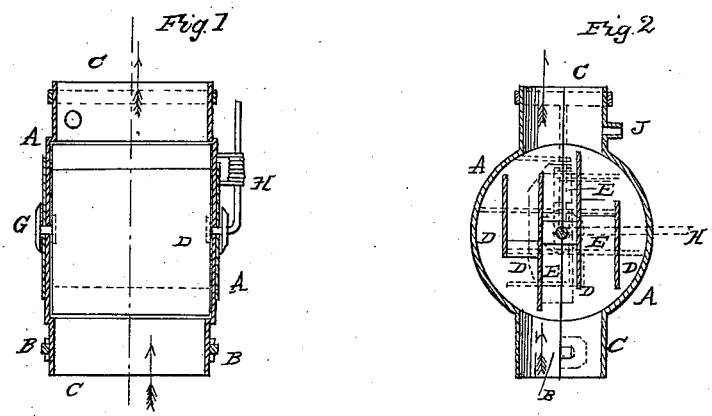

UNITED STATES PATENT OFFICE.

LEVI R. COMSTOCK, OF MACON, MISSOURI.

IMPROVEMENT IN STOVE PIPE AND DAMPER.

Specification forming part of Letters Patent No. 59,362, dated November 6, 1866.

*To all whom it may concern:*

Be it known that I, LEVI R. COMSTOCK, of Macon city, county of Macon, and State of Missouri, have invented an Improved Revolving-Flue Radiator; and I do hereby declare the following to be an exact description thereof, reference being had to the accompanying drawings, and to the letters of reference marked thereon, making a part of this specification, in which—

Figure 1 represents a longitudinal section, and Fig. 2 a cross-section.

The nature of my invention consists in the shape and construction of semicircular concave cast-iron plates, neatly jointed to fit together, and containing in the inside a series of revolving partitions for letting on or shutting off the heat, and a steam-pipe to be extended and attached to any ordinary boiler, commonly used on cooking stoves or ranges, the whole being intended to increase, lessen, or regulate the flow of heat, arranged and combined as hereinafter described.

A represents the semicircular plates, intended to be made of cast-iron or sheet-iron, with grooved edges to fit as a close joint, and a hinge or catch, B, to fasten them together; also collars C at each side, to connect with flues or pipes for receiving and discharging the heat, as indicated by the arrows. D are partitions, forming square chambers E on the inside, the two outer partitions being shorter than the center ones, so as to be revolved in the interior of the drum formed by the semicircular plates. The shaft G is the axis of the partitions D, and is revolved by a button or spring-lever, H, on the outside. The lever being moved one-quarter around turns the partitions and air-chambers to a vertical or horizontal position, which shuts off the heat or draft, or opens it for a free passage, the red lines at Fig. 2 showing the position of the chambers when the draft is shut off and the lever turned one-fourth around.

The pipe J may be extended downward or horizontally, so as to be attached to or connected with any steam-boiler commonly used on cook-stoves, the steam from which assists the draft and purifies the burning-heat.

What I claim as my invention, and desire to secure by Letters Patent, is—

The shape and construction of the semicircular concave cast-iron plates A, with their joints and hinges B, and revolving partitions D, on the inside, with chambers E, combined and operated as herein described, and for the purposes set forth.

LEVI R. COMSTOCK.

Witnesses:
 WILLIAM J. WILSON,
 D. McLEOD.